United States Patent [19]

Zarotti

[11] Patent Number: 4,821,517

[45] Date of Patent: Apr. 18, 1989

[54] ACTUATOR FOR PRODUCING A DISPLACEMENT MOVEMENT ON A SET TEMPERATURE BEING REACHED

[76] Inventor: Claudio Zarotti, Via Marco Polo, 7, 20124 Milano, Italy

[21] Appl. No.: 46,639

[22] Filed: May 7, 1987

[30] Foreign Application Priority Data

May 12, 1986 [IT] Italy .............................. 20401 A/86

[51] Int. Cl.[4] .............................................. F03G 7/06

[52] U.S. Cl. ................................... 60/531; 236/99 R

[58] Field of Search ......................... 60/516, 530, 531; 236/99 R; 251/11; 337/320, 306

[56] References Cited

U.S. PATENT DOCUMENTS

| | | | |
|---|---|---|---|
| 3,410,086 | 11/1968 | Bodkin | 60/531 |
| 3,993,123 | 11/1976 | Chu et al. | 165/80.3 |
| 4,233,813 | 11/1980 | Simmons | 60/531 X |
| 4,311,015 | 1/1982 | Rust | 60/531 X |

*Primary Examiner*—Stephen F. Husar

*Attorney, Agent, or Firm*—Sughrue, Mion, Zinn, Macpeak & Seas

[57] ABSTRACT

An actuator comprises an impervious deformable bladder containing a fluid whose boiling temperature is equal to a set cut-in temperature. On reaching that temperature, the fluid within the bladder will be vaporized, cause the bladder to expand, and produce accordingly a displacement movement which can be utilized for a variety of purposes.

11 Claims, 1 Drawing Sheet

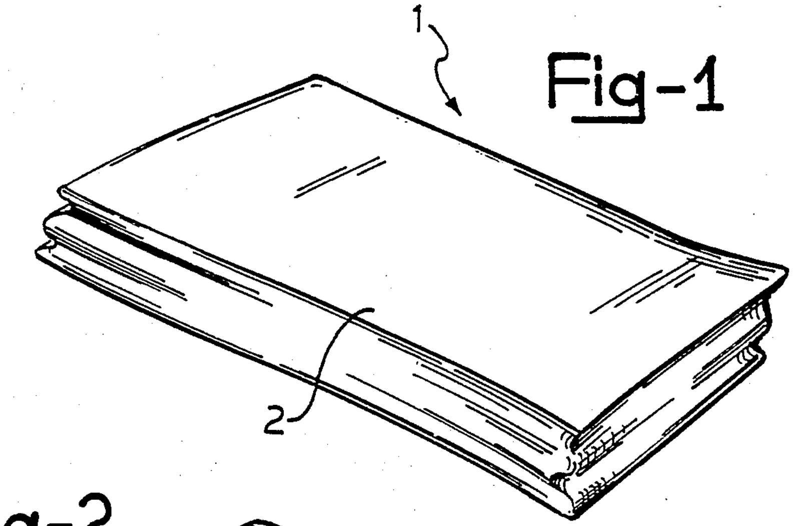
Fig-1
Fig-2
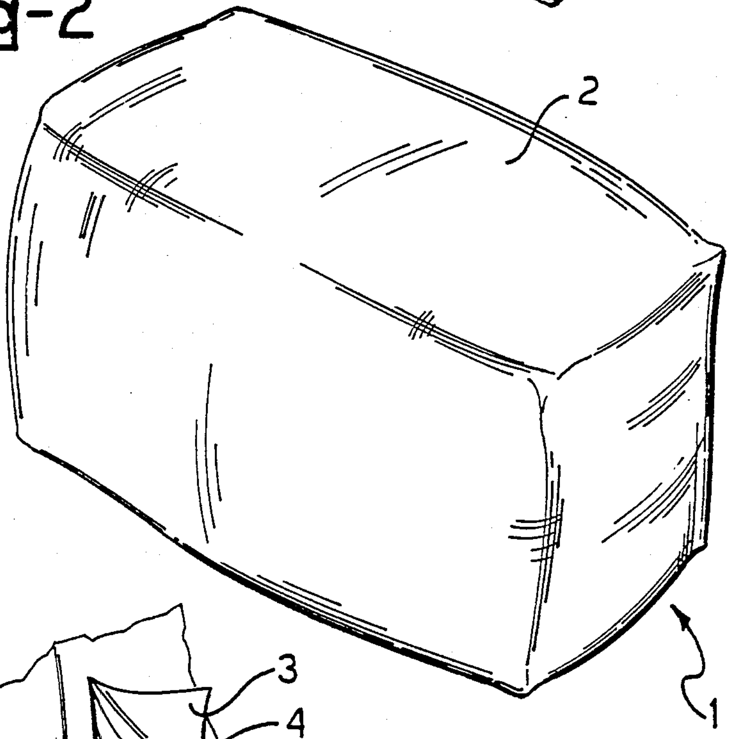
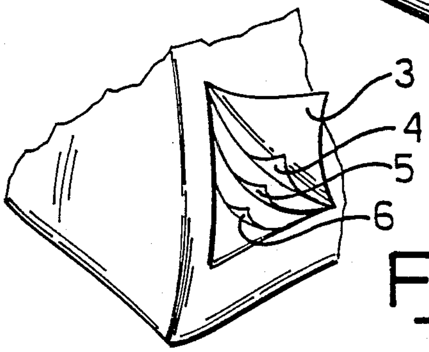
Fig-3

ACTUATOR FOR PRODUCING A DISPLACEMENT MOVEMENT ON A SET TEMPERATURE BEING REACHED

DESCRIPTION

This invention relates to an actuator of a type effective to produce a displacement movement on a set cut-in temperature being reached.

A demand for actuators of this type exists with several engineering branches.

Where the displacement movement involved is a small one, there have been employed heretofore actuators which may be referred to as 'passive' actuators (i.e., actuators requiring no power contribution besides the thermal energy supplied from the environment), and operate on a metal expansion principle (not dissimilar from the principle of the well-known bimetal strips). While fairly large forces may be developed in this manner, the limited extent of the displacement achieved restricts their practical applications to but few instances, most typically the closing and opening of an electric circuit or a small conduit.

Where larger displacements are required, it becomes mandatory to utilize complicated servomechanisms controlled by respective temperature sensors.

It is the object of this invention to provide a passive actuator which affords a larger displacement movement than conventional passive actuators, thereby it can be also used to advantage where servomechanisms have been necessary in the past.

This object is achieved, according to the invention, by an actuator of the type specified above being characterized in that it comprises an impervious deformable bladder containing a fluid whose boiling temperature is equal to the set cut-in temperature.

Further features and advantages of an actuator according to this invention will become apparent from the following detailed description of a preferred embodiment thereof, given here with reference to the accompanying drawing. In the drawing:

FIG. 1 is a perspective view of an actuator according to the invention, shown in a condition of lower temperature than its cut-in temperature;

FIG. 2 is a perspective view of the actuator of FIG. 1, shown in a condition of higher temperature than its cut-in temperature; and FIG. 3 is a part-sectional fragmentary view of the actuator shown in FIG. 2.

In the drawing figures, the numeral 1 generally designates an actuator effective to produce a displacement movement upon a set cut-in or triggering temperature being reached.

The actuator 1 comprises an impervious deformable bladder 2 formed from a multilayered laminate material including layers of a plastics material and layers of a metal material, stably cemented together; more specifically, said laminate material may comprise, for example, a polyester layer 3, a nylon layer 4, an aluminum layer 5, and a polyethylene layer 6, in this order from the outside toward the inside of the bladder 2.

The bladder 2 contains a fluid (not shown in the drawings) whose boiling temperature is equal to the set cut-in temperature.

More specifically, the fluid employed may advantageously be a mixture of various types of Freon, this being the name whereby several substances are known commercially which have a hydrocarbon structure where one or more hydrogen atoms are substituted with halogen atoms, usually chlorine and/or fluorine, but also iodine and bromine. Such substances can be mixed together and have, when taken individually, boiling temperatures within quite a broad range which extends, for the most common of types, from some eighty degrees below zero (Freon 13, 23, 41, 116) up to about ninety degrees above zero (Freon 112); by mixing together two or more such substances, fluids are obtained which have their boiling temperatures within said range.

In particular, by using a highly common Freon mixture such as Freon 12 (raw formula $CCL_2F_2$, boiling temperature −29.8° C.), Freon 11 (raw formula $CCL_3F$, boiling temperature +23.7° C.), and Freon 113 (raw formula $C_2CL_3F_3$, boiling temperature +47.7° C.), a cut-in temperature can be obtained for the actuator 1 which lies within the ambient temperature range. Of course, where a cut-in temperature below −29.8 C. or above +47.7° C. is desired, other, less commonly utilized Freon types or even different type fluids could be used.

Operation of the actuator 1 is quite straightforward.

As long as ambient temperature is lower than the actuator cut-in temperature, the bladder 2 will be in its shrinked condition (see FIG. 1) because the fluid contained therein is in its liquid state.

On reaching the cut-in temperature level, the fluid will begin to boil and vaporize bringing about a gradual expansion of the bladder 2 (see FIG. 2); this expansion progresses rapidly because the volume increase involved in the transition from liquid to vapor is large, and produces the desired displacement movement.

Any further temperature increase with the bladder fully expanded can only result in increased pressure within the bladder itself, and further expansion of a much smaller magnitude than the previous one.

The bladder 2 expansion can be utilized in a variety of ways, e.g. by having the bladder 2 secured to a plate on one side and bearing a lever arm on the other side, or by sandwiching the bladder 2 between two mutually movable plates, or by fitting it into a cylinder, between a cylinder head and a piston.

Understandably, where the actuator is required to overcome a significant force in its displacement movement, the cut-in temperature would be equal to the fluid boiling temperature at the required pressure level to overcome that force.

The inventive actuator constitutes a considerable step forward in the art over conventional bimetal strips, and more generally passive actuators operating on the principle of metal expansion. In fact, it not only affords displacement movements of a much larger magnitude but is also quite simple and inexpensive, requires no maintenance and no contribution of power besides the thermal energy from the environment. This actuator provides direct conversion of heat energy into mechanical work, with the temperature at which the energy is supplied being low and the thermal surge quite limited.

The simple construction of this actuator, by facilitating a highly accurate cleaning procedure, enables its safe use also in controlled sanitation environments; this advantage is the more outstanding where the materials specified in the foregoing are used for the bladder and the fluid which are absolutely non-toxic; should the bladder become punctured incidentally, the ensuing loss of Freon is quite harmless.

I claim:

1. An actuator of a type effective to produce a displacement movement on a preset cut-in temperature being reached, said actuator comprising an impervious deformable bladder formed from a multilayered laminate material, said material comprising a polyester layer, a nylon layer, an aluminum layer, and a polyethylene layer, said bladder containing a fluid having a boiling temperature equal to the set cut-in temperature.

2. An actuator according to claim 1, characterized in that said fluid is a mixture of several Freons.

3. An actuator according to claim 2, characterized in that said fluid is a mixture of Freon 12, Freon 11, and Freon 113.

4. An actuator of a type effective to produce a displacement movement on a preset cut-in temperature being reached, said actuator comprising an impervious deformable bladder containing a fluid mixture of several Freons which mixture has a boiling temperature equal to the preset cut-in temperature.

5. An actuator according to claim 4, characterized in that said fluid is a mixture of Freon 12, Freon 11, and Freon 113.

6. An actuator of the type effective to produce a displacement movement on a preset cut-in temperature being reached, said actuator comprising an impervious deformable bladder formed from a multilayered laminate material, said material comprising a polyester layer, a nylon layer, an aluminum layer, and a polyethylene layer, said bladder containing a mixture of at least two fluids in a preset ratio, having a boiling temperature equal to the preset cutin temperature.

7. An actuator according to claim 6, characterized in that said mixture comprises several Freons.

8. An actuator according to claim 7, characterized in that said mixture comprises Freon 12, Freon 11, and Freon 113.

9. An actuator of a type effective to produce a displacement movement on a preset cut-in temperature being reached, characterized in that it comprises an impervious deformable bladder containing a mixture comprised of several fluids in a preset ratio, having a boiling temperature equal to the preset cut-in temperature.

10. An actuator according to claim 9, characterized in that said bladder is formed from a multilayered laminate material.

11. An actuator according to claim 10, characterized in that said multilayered laminate material comprises a polyester layer, a nylon layer, an aluminum layer, and a polyethylene layer

* * * * *